United States Patent
Goldstone

(10) Patent No.: US 7,301,899 B2
(45) Date of Patent: Nov. 27, 2007

(54) PREVENTION OF BANDWIDTH CONGESTION IN A DENIAL OF SERVICE OR OTHER INTERNET-BASED ATTACK

(75) Inventor: Jonathan S Goldstone, Jerusalem (IL)

(73) Assignee: Comverse Ltd., Tel Aviv (IL)

(*) Notice: Subject to any disclaimer, the term of this patent is extended or adjusted under 35 U.S.C. 154(b) by 724 days.

(21) Appl. No.: 09/774,102

(22) Filed: Jan. 31, 2001

(65) Prior Publication Data

US 2002/0101819 A1 Aug. 1, 2002

(51) Int. Cl.
*H04L 12/66* (2006.01)
*G06F 15/16* (2006.01)

(52) U.S. Cl. .................... 370/230; 370/235; 726/22

(58) Field of Classification Search ........... 370/221, 370/230, 232, 233, 235, 236, 237, 389
See application file for complete search history.

(56) References Cited

U.S. PATENT DOCUMENTS 5,541,987 A * 7/1996 Topper et al. ............. 379/230
5,991,881 A * 11/1999 Conklin et al. ............. 713/201
6,735,702 B1 * 5/2004 Yavatkar et al. ............ 713/201
6,738,814 B1 * 5/2004 Cox et al. ................... 709/225

OTHER PUBLICATIONS

Dapp; Real Time Active Network Compartmentalization; May 16, 2002; United States Patent Application Publication.*
Dapp; Active Intrusion Resistant Environment of Alyered Object and Compartment Keys (Airelock); May 30, 2002; United States Patent Application Publication.*

* cited by examiner

*Primary Examiner*—Chi Pham
*Assistant Examiner*—Soon D. Hyun
(74) *Attorney, Agent, or Firm*—Sughrue Mion Pllc.

(57) ABSTRACT

A method and apparatus for preventing a Denial of Service attack directed at a target that is hosted on a server. The attack is detected and the IP address of the source client of the attack is identified. The IP address of the source of the attack is then communicated upstream to router devices close to the attacking source and the attacker is prevented from further attacks until it is determined that the attacker poses no threat. The detection of the attack and the communication of the identity of the attacker to upstream routers is performed automatically or by human intervention.

14 Claims, 6 Drawing Sheets

PREVENTION OF BANDWIDTH CONGESTION IN A DENIAL OF SERVICE OR OTHER INTERNET-BASED ATTACK

BACKGROUND OF THE INVENTION

Denial of service (DOS) and other Internet-based attacks waged from remote clients against servers, or other clients, have become notorious. These types of attacks can prevent access to e-mail, world-wide web (www) and/or other critical servers. Internet Service Providers (ISPs) are common targets for such attacks whereby, as a result, their mail and web servers can be rendered unavailable to their users for extended periods of time.

The Internet provides an extremely efficient and cost effective way for consumers of products and services, as well as users of information, to contact and interact with providers of that which they seek. The Internet works as well as it does, at least in part, because its data communication protocols (IP, TCP and UDP) have evolved over time. As a result, the protocols have developed a renowned robustness that makes user friendly. However, these protocols were designed with the basic assumption that all users, especially network administrators, operate with good-will. Unfortunately, this assumption does not hold true in today's Internet environment. A malicious person, equipped with a machine connected to the Internet and a modicum of protocol knowledge, can configure the machine to generate and deliver a large number of illegitimate requests to the servers, so many illegitimate requests that the servers become overloaded and cannot respond to legitimate requests.

One method by which the malicious individual can attack a server, for example a web server, is known as a "SYN" (synchronous) attack. A SYN attack is a denial of service attack that blocks other users from connecting to the target server. Details of a SYN attack are provided below.

The Internet protocol stack uses three layers of the Open System Interconnection (OSI) model. The lowest layer is the physical layer, and it contains the physical wires, network client adapter(s) and adapter device driver(s). The next layer is the data link layer, whose job is to read a stream of bits off the network and assemble them into frames for the next higher layer.

The Internet Protocol (IP) or network layer is the next layer. The IP packet is examined to ensure error free reception and the destination address field is evaluated to ensure that the packet is addressed to this station either directly as the end destination or indirectly if the station is a router, etc. The packet contents are further evaluated by the IP layer for a number of IP related activities, such as Address Resolution Protocol (ARP) or Internet Control and Message Protocol (ICMP).

If the packet is not one of the above formats, its contents continue to be evaluated as a Transmission Control Protocol (TCP) or User Datagram Protocol (UDP) packet. If the packet contains a TCP header, it is moved to the next higher (Layer 4) TCP layer for further processing to be conducted sometime in the future. In other words, it is at the IP-TCP boundary where information waits for processing based upon requests from programs that wish to communicate with the network. Therefore, the IP-TCP boundary contains a fixed amount of memory buffers allocated to network "activity". It is at the TCP level that the SYN attack typically takes place. By sending many requests, the attacking client causes the attacked server to utilize much, or all, of its buffer space to store the "SYN attack" requests, thereby creating a lack of sufficient buffer space to store legitimate requests.

Steps for creating a connection require the client to request a "connect" which puts an IP packet in the server's IP-TCP boundary buffers. The server program requests a "listen", then an "accept". It is during these listen-connect-accept steps that TCP employs a "three-way handshake" to establish a connection. FIG. 2 illustrates a basic three-way handshake routine.

Six bits are defined in the TCP datagram header, two of which are the "SYN" (synchronize) and "ACK" (acknowledge) bits. When a client wishes to establish a connection with a server, or process, the client sends a datagram to the server with the SYN bit set and the ACK bit cleared, i.e., the first part of the three-way handshake. When the server receives the datagram, it reserves resources in its buffers and responds to the client with a separate datagram with both the SYN and ACK bits set, i.e., the second part of the three-way handshake. Typically, after the client receives the datagram from the server acknowledging that the server recognizes the desired connection, the client responds with yet another datagram wherein the SYN bit is cleared and only the ACK bit is set, i.e., the third and final part of the three-way handshake. When the server receives this last datagram from the client, the connection is established.

Under normal circumstances, connections to a server are established quickly, thus, only a few, i.e., ten, buffers are expected to be needed for all possible connections in the server. In a SYN-type denial of service attack, however, a program on a malicious user's client does not adhere to the SYN-ACK protocol; instead the program opens a raw network connection directly to the server and sends a burst of TCP SYN datagrams, ignoring any ACK replies from the target server. The buffers fill up quickly and the target server is unable to establish any subsequent connections, which denies service to legitimate users on other clients.

Typically, the upper limit for each program running on the server is ten un-ACK'd connection requests outstanding. When the backlog queue limit is reached, any attempts to establish other connections fail until a backlogged connection either becomes established (i.e., a SYN/ACK packet is ACK'd), reset (i.e., an RST packet is received) or timed-out (typically 75 seconds).

This situation can be made worse if the attacker inserts random IP source addresses, called IP "spoofing", into each SYN datagram, thereby making it almost impossible for the server to trace the datagrams back to the real source. This type of DOS attack is referred to as a Distributed Denial of Service attack (DDOS) due to the distribution of the apparent attackers.

Several solutions, or at least partial solutions, to the SYN-type DOS attack already exist. For example, Cisco utilizes techniques within its routers to detect that a SYN-type attack is underway and then takes steps to prevent the attack. Detection of the attack is performed in one of two ways. The first method of detecting a SYN attack used by Cisco comprises comparing the rate of requests for new connections and the number of half-open connections to a configurable threshold level to detect a "flood" of SYN requests. When the router detects unusually high rates of new connections, it issues an alert message and then takes steps to control the flood. In accordance with a second method used by Cisco, all TCP connections are monitored to inspect packet sequence numbers in order to detect packet injections. If the packet sequence numbers are not within expected ranges, the router drops suspicious packets.

Once a SYN flood is detected, Cisco routers utilize one of two methods to prevent further flooding. The first method entails dropping old, half-open TCP connections to prevent system resource depletion. Instructing the server to clear out old connections prevents the system from overloading or shutting down. An administrator configures a maximum number of allowable half-open connections and a timeout value before half-open connections are deleted.

A second Cisco method comprises temporarily disabling or blocking all SYN request packets into the target server under attack to protect the router. This temporary blockage apparently keeps the rest of the system operating, although it disables the initiation of new, legitimate as well as malicious, connections to the server. An administrator can configure an automatic timeout period for the protected server to serve new connections again or the administrator can manually restart the router.

SYN-type flood attacks can also be detected by a "Firewall" placed between the server and the server's Internet router. For example, Checkpoint Software Technologies provides two software applications to be run on their Firewall products. As described in more detail below, the first software application counters the attack by ensuring that the three-way handshake is actually completed (i.e., the connection is a valid one) before sending a SYN packet to the desired destination of a connection.

The first Checkpoint application operates as follows. The Firewall intercepts a SYN packet destined for the server and does not pass the SYN packet to the server. Rather, the Firewall acts on the server's behalf and replies with a SYN/ACK packet to the client desiring the connection. Then, only if an ACK packet is received from the client does the Firewall send a SYN packet to the server. The server then replies to the SYN packet with a SYN/ACK sent to the Firewall and the Firewall replies to the remote server with an ACK. At this point the connection from the client to the server is established and the Firewall is able to begin passing data packets between the client and server.

One of the apparent capabilities of a Firewall running the application described above is the ability to translate the connection sequence numbers which are now different for each half of the connection, due to the intervention of the Firewall. Further, if the Firewall does not receive any response from either the client or the server for several seconds, or if it gets a RST when an ACK or a SYN/ACK is expected, it terminates the connection immediately.

Checkpoint's second software application also runs on its Firewall products and apparently alleviates problems associated with the technique of resetting the SYN connection as discussed previously. In order for the technique of resetting SYN connection attempts to be effective against SYN-type flood attacks, the reset timer must be small enough to keep the target server's backlog queue from filling up, while at the same time the timer must be large enough to allow users attempting to connect over a slow link to connect. Checkpoint addresses this problem by making sure that an ACK packet is sent in immediate response to the server's SYN/ACK packet. When the server receives the ACK packet, the connection is removed from the backlog queue and the connection becomes an open connection on the server. Since Internet servers can typically handle hundreds or thousands of open connections, the SYN-type flood attack is less effective in creating a denial of service condition at the server.

Another technique used to help prevent SYN-type flood attacks is the use of egress Hand ingress filtering. Egress filtering comprises imposing controls on the type of traffic permitted to leave a particular network. For example, the source address associated with network traffic should correspond directly to the location where it physically originated. Because routers at a client's Internet gateway can monitor this correspondence, or lack thereof, it is possible for these routers to detect potentially malicious traffic and prevent it from getting to the Internet and, hence, the target server.

At the receiving end of a connection, ingress filtering can also be employed. Ingress filtering is performed at the server's router or firewall and comprises denying access to all but a specified list of clients. This method assures that unknown or unverified users cannot connect to the target server, but it also prevents otherwise legitimate, but unknown, users from connecting as well.

The solutions described above all provide positive steps in preventing or at least diminishing the potentially devastating effects of a DOS attack. However, these measures are only a partial solution and the DOS attack will likely still succeed. Blocking the DOS source at the network equipment, i.e., at the access router or firewall, ensures that the targeted server will not crash. However, the DOS attack will still succeed because the access bandwidth to a website resident on the target server will be congested by the overload of illegitimate SYN requests. This overload prevents legitimate users from accessing the website.

While the SYN attack is one of the most common types of DOS attacks, there are a variety of others that also cause similar detrimental effects, such as the "PING O' DEATH," which is an attack that takes advantage of a known bug in TCP/IP implementation. The attacker uses the "ping" system utility to make up an IP packet that exceeds the maximum number of bytes of data allowed by the IP specification. Systems simply crash or reboot themselves when they receive such an oversized packet.

Regardless of the type of attack that is waged, currently when an attack is detected, manual intervention is required. For example, the site administrator of the website resident on the target web server will alert the local Internet Service Provider (ISP) who will in turn alert other resources on the Internet to deny access to the sources of the attack. This is a slow manual process that relies on the skill of the site administrator. Furthermore, there is a danger that the often limited bandwidth connecting the website to the Internet could be blocked by the amount of data transferred in the attack. This prevents legitimate users from obtaining reasonable service.

SUMMARY OF THE INVENTION

In view of the aforementioned problems with the conventional approach to preventing and/or diminishing the effects of DOS attacks, the present invention provides a method and apparatus for preventing attackers in a DOS attack from attacking other servers on the Internet once a DOS attack has been detected. For purposes of the following discussion related to the present invention, the term Denial of Service (DOS) attack includes all Internet-based attacks.

It is a further object of the present invention to provide a method and apparatus whereby said prevention of a DOS attack is performed by detecting the address of an attacking client on the Internet and informing routers also connected to the Internet of the attacker's address.

It is yet another object of the present invention to provide a method and apparatus whereby the address of an attacking client in a DOS attack is automatically communicated to the router closest to the attacking client.

It is yet another object of the present invention to provide a method and apparatus whereby once a router is informed of an attacking client's address in a DOS attack, the router then prevents the attacking client from perpetrating further attacks by blocking traffic originating from the attacking client from entering the Internet.

It is yet another object of the present invention to provide a method and apparatus whereby relevant parties are notified that a DOS attack has been waged and that measures to thwart the attack have begun.

It is yet another object of the present invention to provide a method and apparatus whereby once an attacking client's address has been banned from being used in transmitting traffic onto the Internet, the ban is lifted after a time interval sufficient to determine that the attacker is no longer a threat, or is no longer attempting to perpetrate a DOS attack.

It is yet another object of the present invention to provide a method and apparatus whereby a DOS attack can be detected either automatically by a router connected to the target server, or it can be detected by human intervention.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
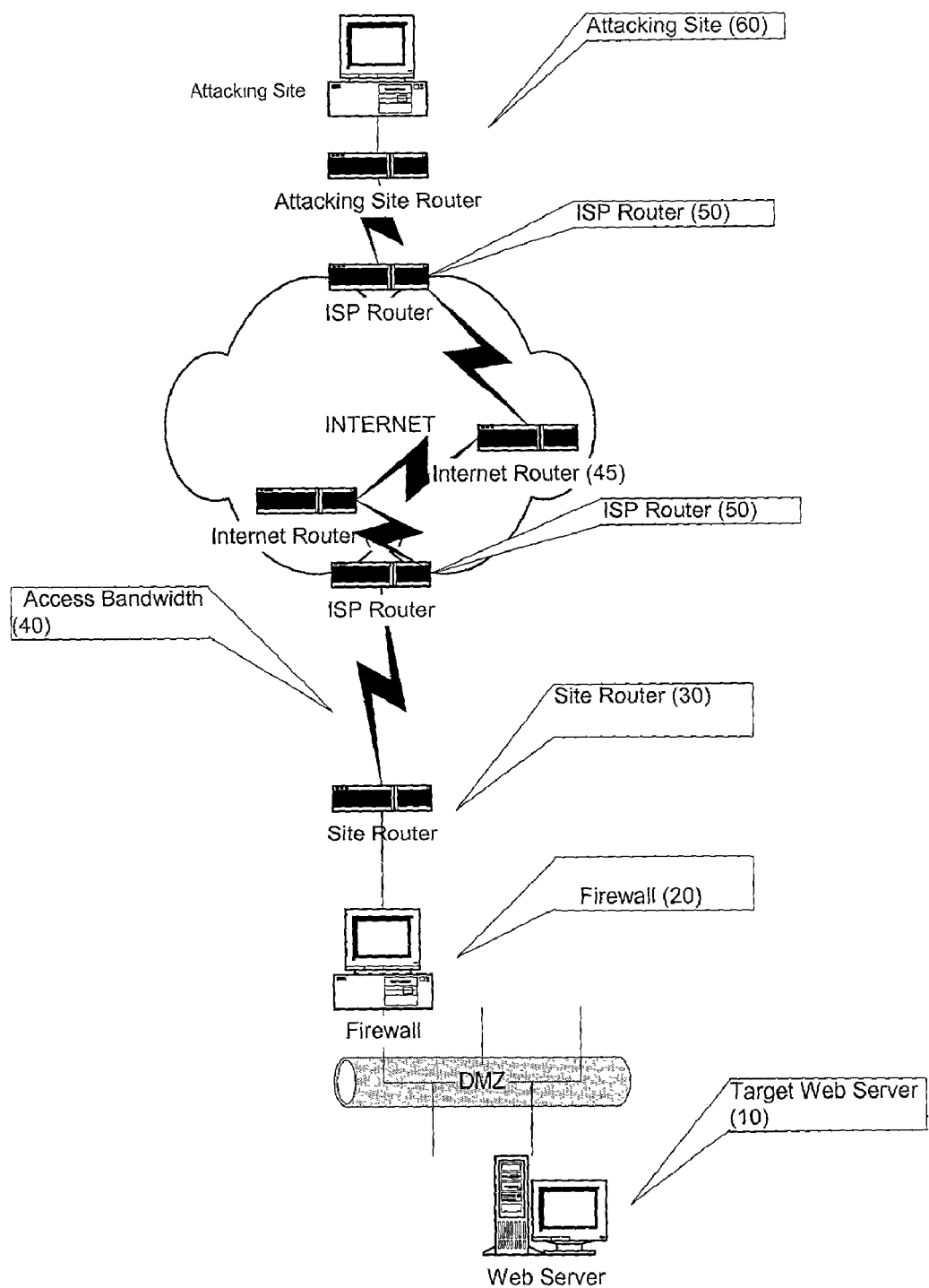
FIG. 1 is a pictorial representation of system connections in an Internet environment.
Figure 2:
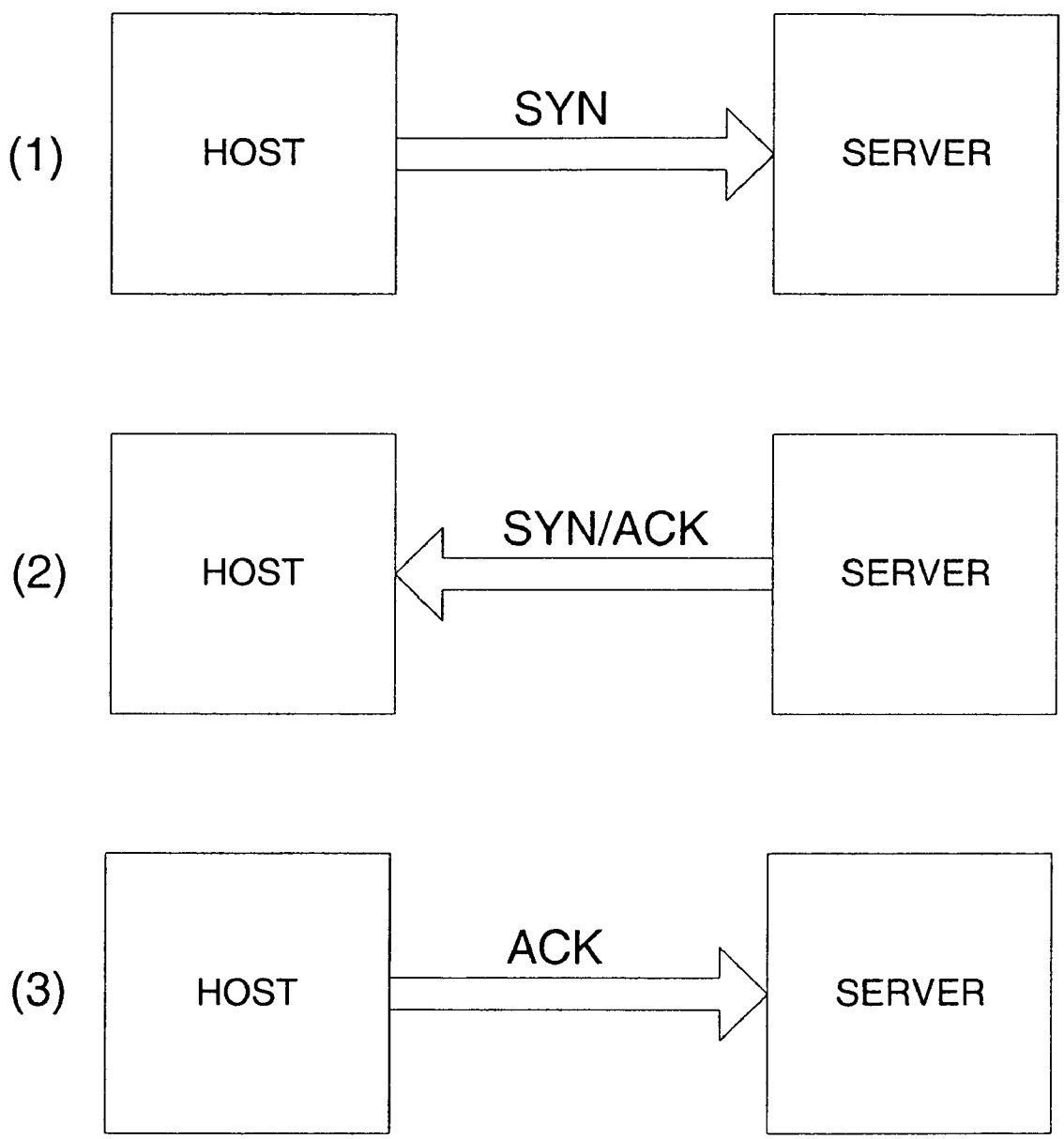
FIG. 2 is a representation of a standard three-way handshake between a client and a server with which the client is attempting to establish communication.
Figure 3:
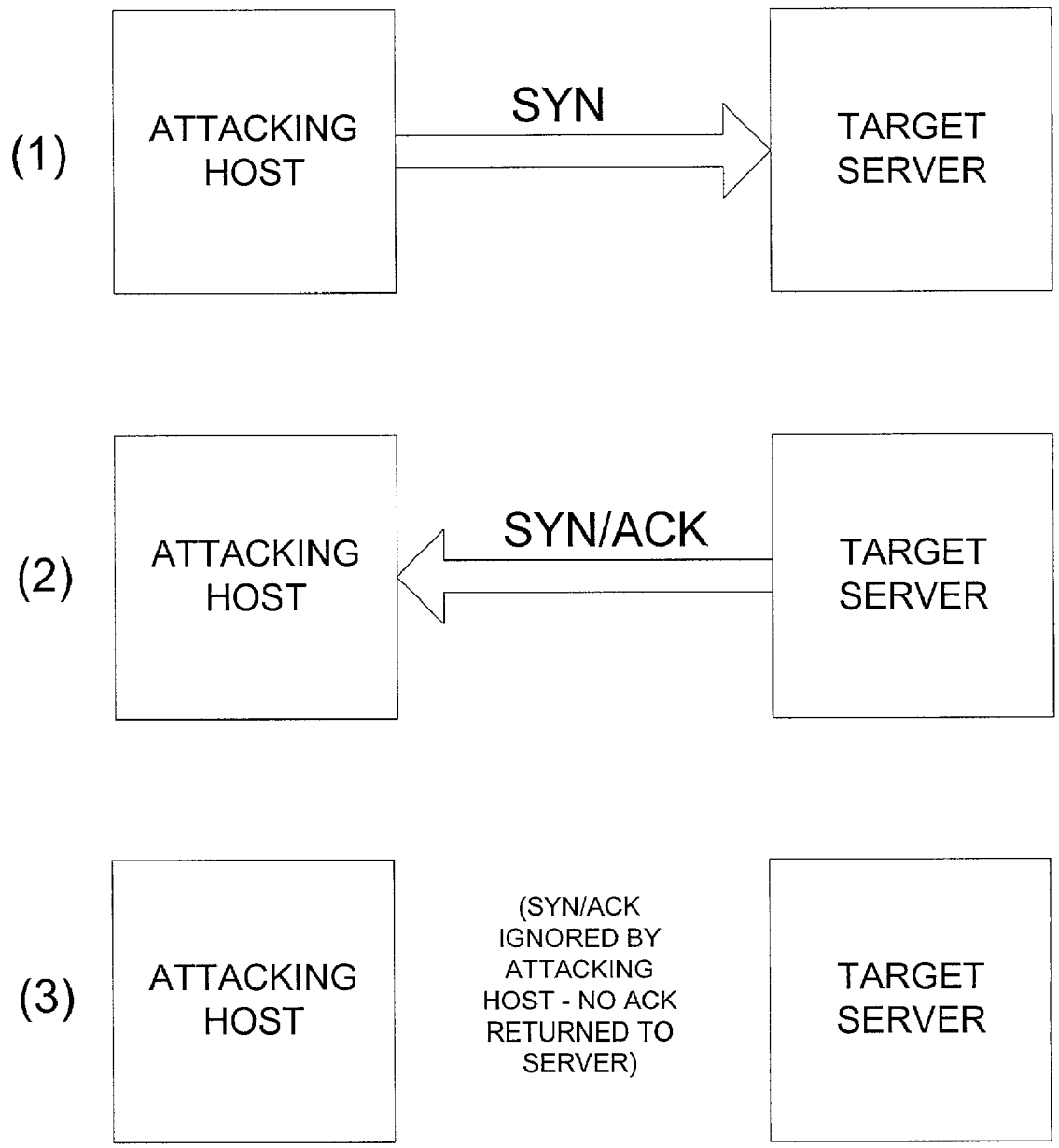
FIG. 3 is a representation of a half-open connection resulting from a failed three-way handshake.

In a Denial of Service (DOS) attack, as outlined above and depicted in FIG. 1, it is common for an attacking client (60) to repeatedly solicit a number of connections from a target server (10) connected to the Internet. The attacker, however, typically has no intention of completing the standard three-way handshake, illustrated in FIG. 2, which is required to establish a connection. Accordingly, if/when a response is sent from the server (10) to the client (60) acknowledging the intention to connect, the attacking client merely ignores the response, resulting in a half-open connection, illustrated in FIG. 3. The server under these circumstances, not realizing that there is no intention to connect, 'assumes' that the request is legitimate and reserves buffer space for the connection. Even if half-open connections are dropped by the server after a period of time, the server's bandwidth will still get congested since the attacking client will continue to send bogus requests to the server.

Within the attacker's request to connect, however, a source IP address (which may be forged or spoofed) is included that identifies the client (60) from which the request was initiated. Thus, by using a "record" of bogus connection requests, it is possible to deny future requests to connect that are initiated from an attacking client. This "denial" operation typically takes place at the server's router and, thus, the attacker continues to utilize valuable bandwidth of the communication channel between the remote client and the server's router by sending additional bogus requests for a connection.

Figure 4:
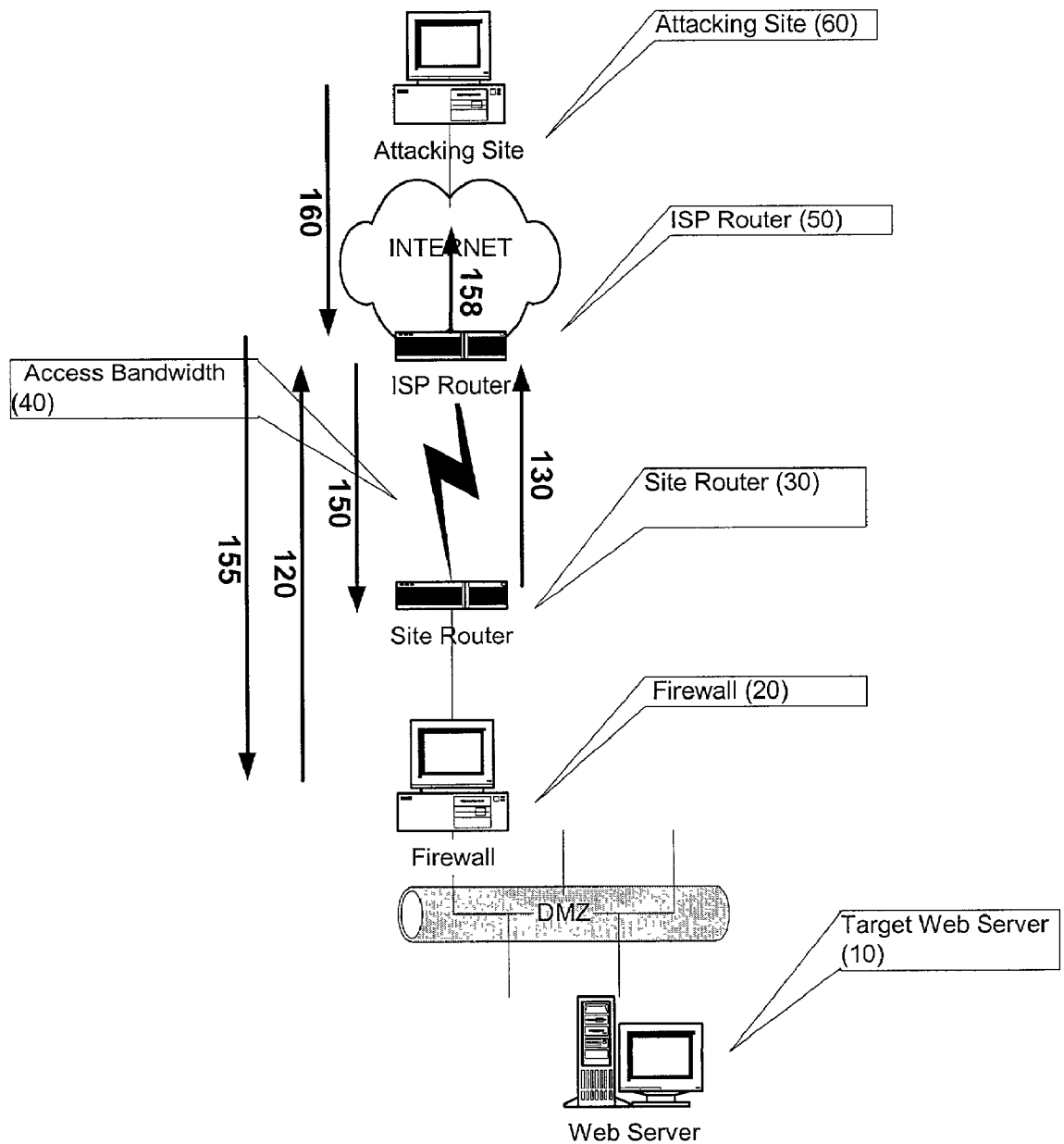
FIG. 4 is a pictorial representation of a system and its flow of data in accordance with the present invention.

One embodiment of the present invention is depicted in FIG. 4. A description of the embodiment depicted in FIG. 4 is described hereafter.

Attacking client (60) initializes an attack on server (10) by sending a request to connect (160) over the Internet. The ISP Router (50) of the attacking client (60) receives the request and routes (150) the request to the appropriate site router (30) corresponding to the target server (10). If an attack is not detected, Site Router (30) then routes the request information, or packet, to the target server (10), either directly or through a firewall (20) which may be in place between site router (30) and the target server (10). If an attack is detected, however, using techniques similar to those described previously, a system in accordance with the present invention proceeds to take responsive action to eliminate, or at least diminish, the effects of the attack. The responsive actions taken in accordance with the present invention are described below.

Upon detection of an attack, by either site router (30) or firewall (20), the attacking client's IP address, determined from the request packet, is automatically communicated upstream (130) to the ISP Router (50), through which the request was passed. ISP Router (50), using an access list or some other such mechanism is, thus, able to prevent any further bogus requests from being placed onto the Internet from the attacker. Accordingly, bandwidth (40) which would otherwise continue to be unnecessarily utilized, servicing bogus requests for connection and corresponding responses between the attacking client (60) and the target server (10), would be made available for legitimate traffic.

According to another aspect of the invention, not only is the router (50) that is providing a conduit to the Internet for the attacker (60) informed of the IP address of the attacker, but other routers (not shown) can also be so informed. For example, the IP address of the attacking client (60) can also be communicated to the router that is physically closest to the attacker. This permits blocking of the attacking client at the point closest to the attacker's entry to the Internet. By closing off the pathway to the Internet at the attacker's closest entry point, or router, the attacker's ability to find other routes of attack is diminished.

Also, by automatically informing other routers (not shown) of the attack and the IP address(es) associated therewith, the attacker stands less of a chance of being able to continue its attack using other routers. The IP addresses corresponding to requests that resulted in half-open connections in the server can be banned from transmitting traffic through the routers.

Even if the attacker (60) has 'spoofed' other legitimate IP addresses in order to disguise its own identity, in similar fashion to the way in which non-spoofed addresses were communicated the spoofed addresses will be communicated upstream as well. However, because it is possible that a spoofed address may actually correspond to an otherwise innocent client that legitimately desires to connect to the target server, or some other server, additional measures must be taken in order to prevent the unjustified denial of the innocent client from gaining access to the Internet. According to the invention, because several routers will have likely been informed of the spoofed address and, as a result, will likely seek to block the innocent client, the present invention provides for a time-limited denial, wherein the spoofed address is only initially blocked until further identity checking can be carried out.

Thus, in accordance with the present invention, after an attack has been detected and a predetermined amount of time has elapsed, sufficient to allow for the determination by the router of whether a given IP address should or should not be allowed to transmit traffic through the router, the ban can be lifted and the previously banned IP address(es) can once again be used in an attempt to connect through the router(s), if so desired.

As an alternative to having a router determine if/when a particular ban should be lifted, human intervention can also be instituted. In other words, when an attack has been detected and particular IP address(es) have been banned from gaining access through the remote router(s), a person, instead of the router, can first verify that the attack has been thwarted before allowing the banned IP address(es) to gain access.

Figure 5A:
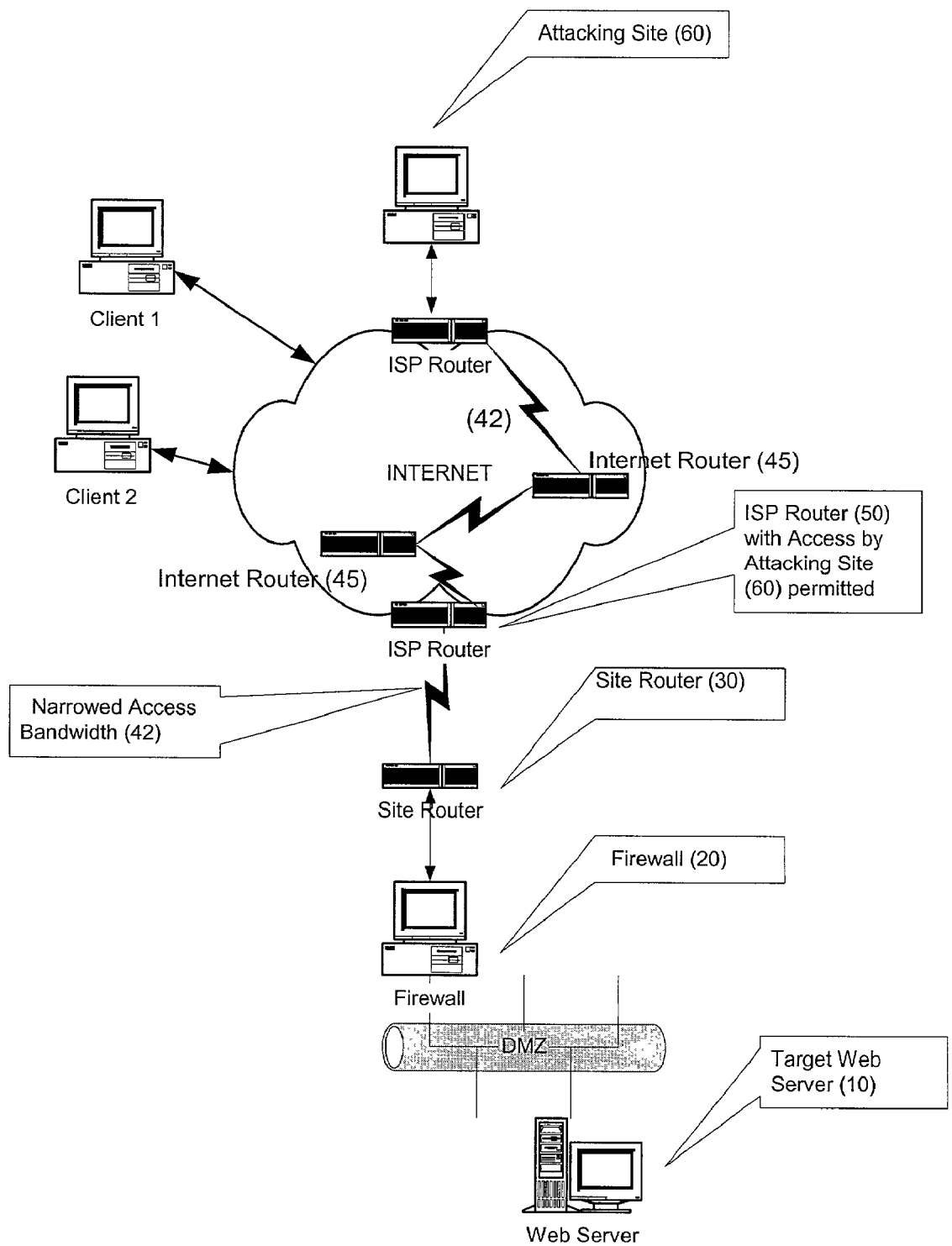
FIG. 5A is a pictorial representation of a system in accordance with the prior art wherein the access bandwidth is narrowed due to an attack.
Figure 5B:
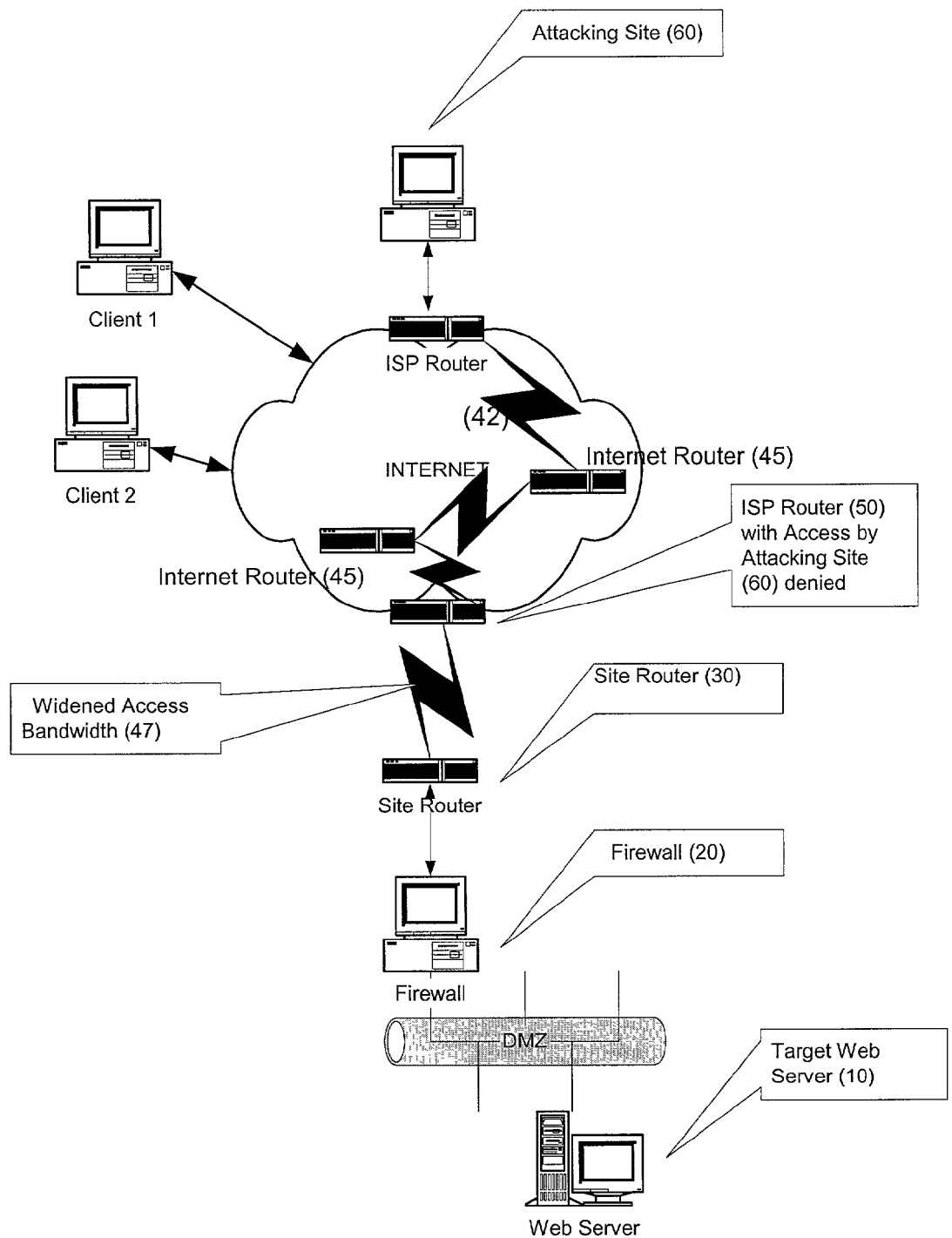
FIG. 5B is a pictorial representation of a system in accordance with the present invention wherein the access bandwidth is widened.

By way of illustration, FIGS. 5A and 5B show how the invention can help alleviate problems caused by bandwidth congestion that result from a denial of service attack. For example, in FIG. 5A, due to the fixed access bandwidth by which all clients connect to the Internet, if client 1 desired to communicate with client 2 during an ongoing attack, his/her abilities to do so would be severely limited, if not destroyed altogether. The reason for client 1's inability to communicate with client 2 is that the Internet bandwidth (47) has been severely narrowed by the attack of site (60) on web server (10). The Internet consists of many paths of varying performance grades and no guarantee is made to its users. It follows, therefore, that an attack as shown may adversely impact other communications between two parties (clients 1 and 2 in the figure) who are unrelated to the actual attack process.

On the other hand, as illustrated in FIG. 5B, in accordance with the present invention, when the attacking site (60) is stopped, or locked out from the Internet, at its closest location to the Internet, the access bandwidth (47) is widened. Widening of the bandwidth results from the elimination of the offending bogus connection requests by attacking site (60). In other words, attacking site (60) is prevented by the router closest to site (60) from gaining access to the Internet, thus allowing legitimate communications, i.e., between client 1 and client 2, to be carried out.

It should be emphasized that the invention described above is directed to many different types of Denial of Service attacks. Any reference to any specific type of attack is intended solely for the purposes of providing an example to aid the reader in understanding the technical aspects of the invention and is not intended to limit the scope of the invention in any way. It is apparent that the skilled artisan would be able to use the invention described herein to either solve and/or minimize the detrimental effects of many different types of DOS or Internet-based attacks.

What is claimed is:

1. A method for preventing bandwidth congestion on a network, said method comprising:
    providing a destination site router connected to a destination site locally and also to an Internet connection;
    providing a plurality of origin site routers one or many of which may be connected to an attacking site, wherein each of said plurality of origin site routers has a respective address associated with it;
    providing connectivity between said origin and destination site routers to the Internet or other wide area networks (WAN), but allowing addresses not corresponding to said attacking site access to the Internet or other WAN;
    detecting a bandwidth congestion at said destination site router, wherein said bandwidth congestion originates at said attacking site;
    informing said origin site router and other intermediate routers within the Internet, or other WAN, of said bandwidth congestion and of an attacking address corresponding to said attacking site from which said bandwidth congestion originated, wherein said attacking address is determined from a request packet received from said attacking site;
    preventing said attacking address corresponding to said attacking site from being used to gain access to the Internet or other WAN.

2. A method in accordance with claim 1, wherein said informing is performed automatically by said destination router.

3. A method in accordance with claim 1, wherein said informing is performed by human intervention.

4. A method in accordance with claim 1 further comprising:
    informing a plurality of remote routers connected to the Internet of said attacking address.

5. A method in accordance with claim 1, wherein said preventing is performed for a predetermined amount of time during which it is determined whether said attacking site is attempting to cause said bandwidth congestion and said attacking site is permitted to gain access to the Internet if it is determined that said attacking site is not attempting to cause said bandwidth congestion.

6. A method in accordance with claim 1, wherein said preventing is performed until a human administrator intervenes after determining whether said attacking site should be permitted to gain access to the Internet.

7. The method in accordance with claim 1, wherein said attacking address corresponding to said attacking site is prevented from being used to gain access to the Internet or other WAN using an access list on said origin site router and other intermediate routers.

8. A network system that prevents bandwidth congestion on a network, said system comprising:
    an origin client router connected to a plurality of clients through an Internet connection, said plurality of clients including an attacking client, and wherein each of said plurality of clients has a respective address associated with it;
    a destination site router connected to a destination server, said destination site router or firewall or client further comprising a bandwidth congestion detector operable to detect a bandwidth congestion condition and a communication device operable to communicate said bandwidth congestion condition and said addresses to said plurality of clients;
    a router-router connection between said origin client router and said destination site router, wherein said router-router connection provides a discrete amount of access bandwidth by which said client router and said destination site router can pass data traffic back and forth to each other;
    wherein said bandwidth congestion detector detects a bandwidth congestion condition originating at said attacking client and directed to said destination server and automatically informs said origin client router of said attacking client's respective address, and wherein further, said origin client router prevents said address of said attacking client from causing further bandwidth congestion, but allows legitimate client address access to the Internet connection, wherein said attacking client's respective address is determined from a request packet received from said attacking client.

9. A system in accordance with claim 8, wherein said destination site router further informs a plurality of other intermediate routers within the Internet or shared WAN routers in addition to said origin client router.

10. A system in accordance with claim 8, wherein said origin client router prevents said address of said attacking client from gaining access to the router-router connection until such a time when it is determined that said attacking client is no longer attempting to cause bandwidth congestion.

11. A method for preventing bandwidth congestion on a network, said method comprising:
providing a destination site router connected to a destination site locally and also to an Internet connection;
providing a plurality of origin site routers one or many of which may be connected to an attacking site, wherein each of said plurality of sites has a respective address associated with it;
providing connectivity between said origin and destination routers to the Internet or other wide area networks (WAN);
detecting a bandwidth congestion at a firewall connected to said destination site router, wherein said bandwidth congestion originates at said attacking site;
informing said origin site router and other intermediate routers within the Internet, or other WAN, of said bandwidth congestion and of an attacking address corresponding to said attacking site from which said bandwidth congestion originated, wherein said attacking address is determined from a request packet received from said attacking site;
preventing said attacking address corresponding to said attacking site from being used to gain access to the Internet or other WAN, but allowing legitimate addresses access to the Internet or other WAN.

12. A method for preventing bandwidth congestion on a network, said method comprising:
providing a destination site router connected to a destination site locally and also to an Internet connection;
providing a plurality of origin site routers one or many of which may be connected to an attacking site, wherein each of said plurality of sites has a respective address associated with it;
providing connectivity between said origin and destination routers to the Internet or other wide area networks (WAN);
detecting a bandwidth congestion at said destination site, wherein said bandwidth congestion originates at said attacking site;
informing said origin site router and other intermediate routers within the Internet, or other WAN, of said bandwidth congestion and of an attacking address corresponding to said attacking site from which said bandwidth congestion originated, wherein said attacking address is determined from a request packet received from said attacking site;
preventing said attacking address corresponding to said attacking site from being used to gain access to the Internet or other WAN, but allowing legitimate addresses access to the Internet or other WAN.

13. A network system that prevents bandwidth congestion on a network, said system comprising:
an origin client router connected to a plurality of clients through an Internet connection, said plurality of clients including an attacking client, and wherein each of said plurality of clients has a respective address associated with it;
a destination site router connected to a destination server;
a firewall connected to said destination server, said firewall comprising a bandwidth congestion detector operable to detect a bandwidth congestion condition and a communication device operable to communicate said bandwidth congestion condition and said addresses to said plurality of clients;
a router-router connection between said origin client router and said destination site router, wherein said router-router connection provides a discrete amount of access bandwidth by which said client router and said destination site router can pass data traffic back and forth to each other;
wherein said bandwidth congestion detector detects a bandwidth congestion condition originating at said attacking client and directed to said destination server and automatically informs said origin client router of said attacking client's respective address, and wherein further, said origin client router prevents said address of said attacking client from causing further bandwidth congestion, but allows legitimate clients access to the Internet connection, wherein said attacking client's respective address is determined from a request packet received from said attacking client.

14. A network system that prevents bandwidth congestion on a network, said system comprising:
an origin client router connected to a plurality of clients through an Internet connection, said plurality of clients including an attacking client, and wherein each of said plurality of clients has a respective address associated with it;
a destination site router connected to a destination server, said destination server comprising a bandwidth congestion detector operable to detect a bandwidth congestion condition and a communication device operable to communicate said bandwidth congestion condition and said addresses to said plurality of clients;
a router-router connection between said origin client router and said destination site router, wherein said router-router connection provides a discrete amount of access bandwidth by which said client router and said destination site router can pass data traffic back and forth to each other;
wherein said bandwidth congestion detector detects a bandwidth congestion condition originating at said attacking client and directed to said destination server and automatically informs said origin client router of said attacking client's respective address, and wherein further, said origin client router prevents said address of said attacking client from causing further bandwidth congestion, but allows legitimate client(s) access to the Internet connection, wherein said attacking client's respective address is determined from a request packet received from said attacking client.

* * * * *